P. C. SCHROEDER.
PUNCHING MACHINE.
APPLICATION FILED MAR. 12, 1915.
1,213,275.
Patented Jan. 23, 1917.
6 SHEETS—SHEET 3.
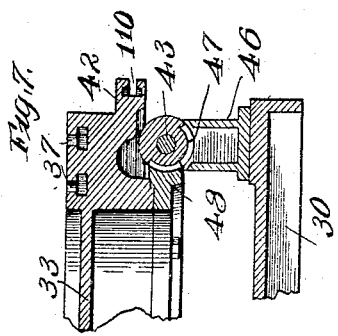
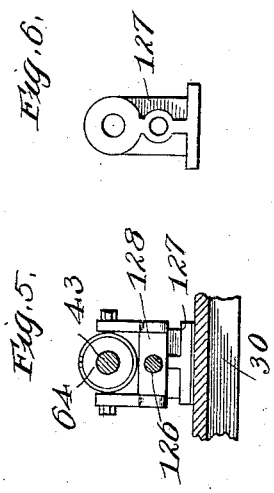
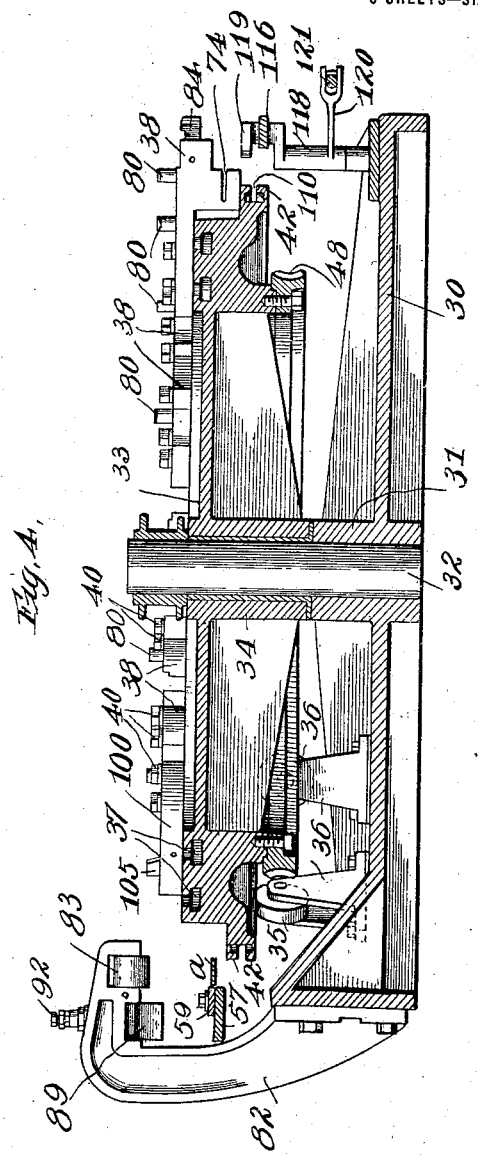
Witnesses:
G A Waubenschmidt
C. Paul Parker
Inventor:
Paul C Schroeder,
By Miller & Chindahl
Attys.

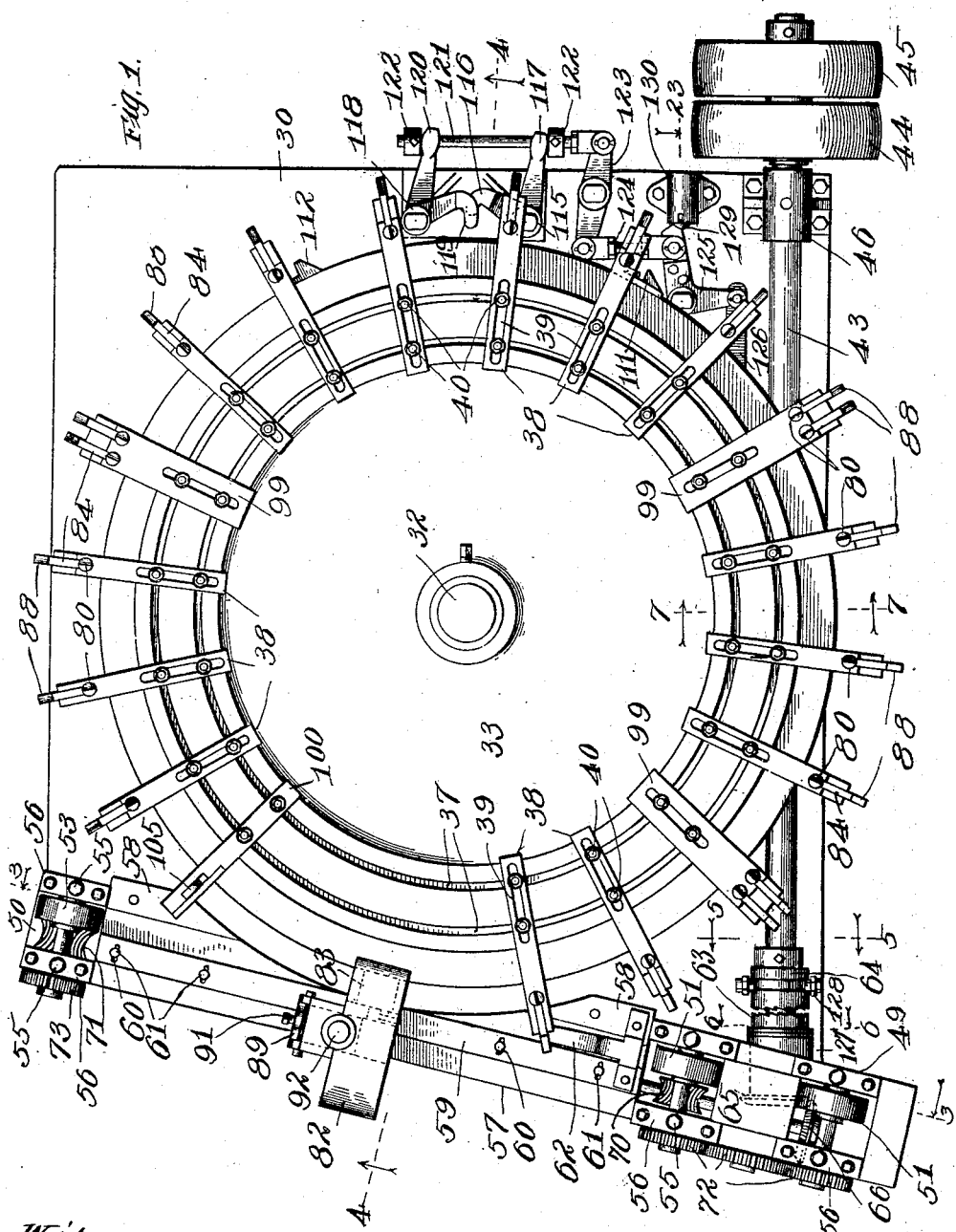

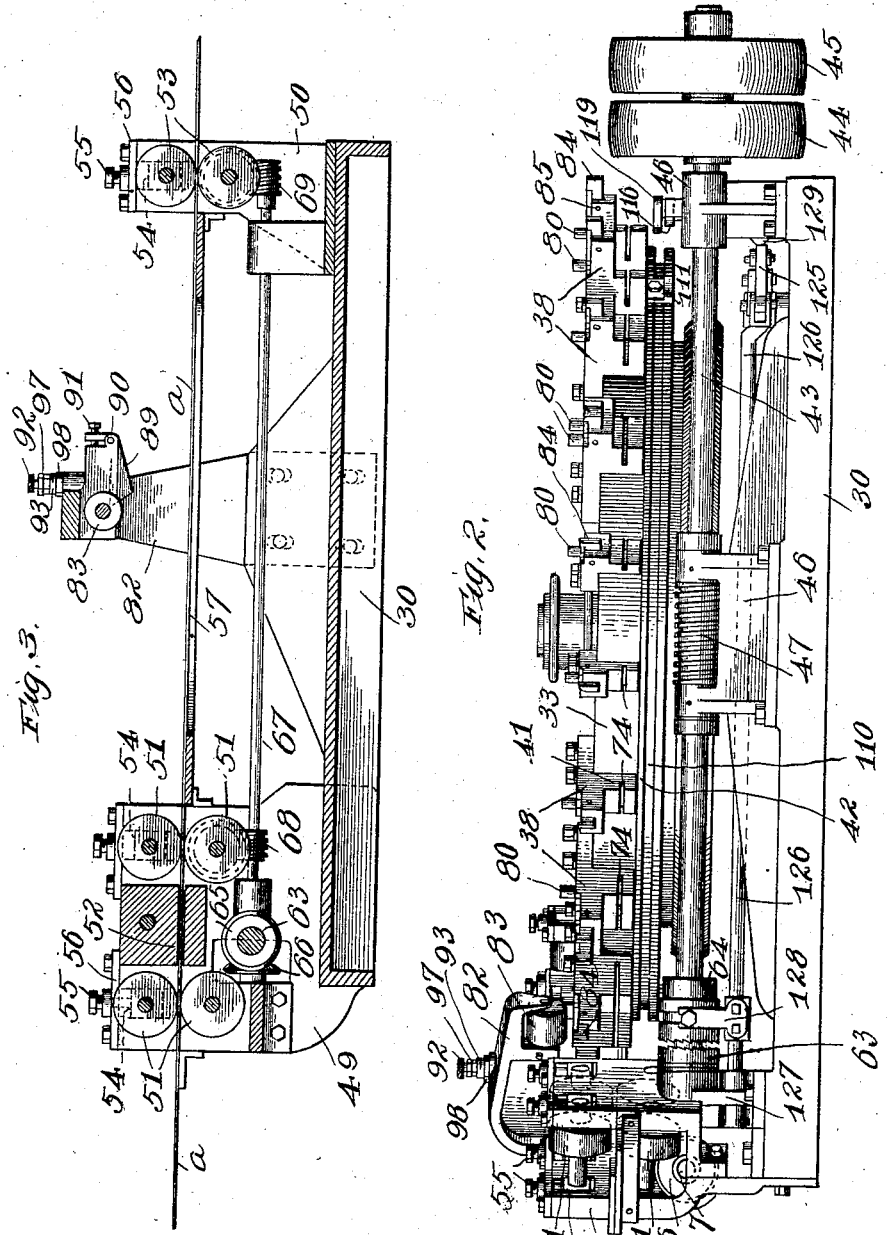

P. C. SCHROEDER.
PUNCHING MACHINE.
APPLICATION FILED MAR. 12, 1915.
1,213,275.
Patented Jan. 23, 1917.
6 SHEETS—SHEET 4.
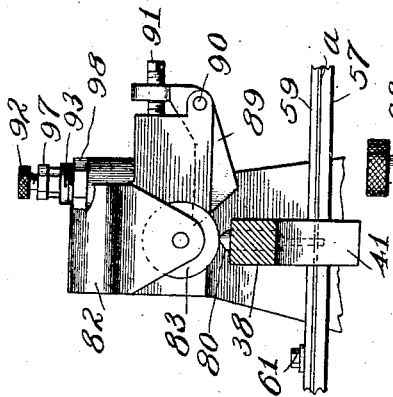
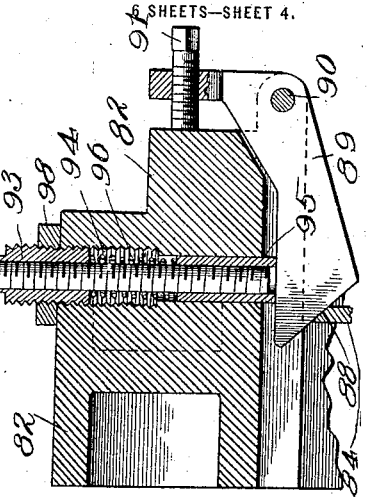
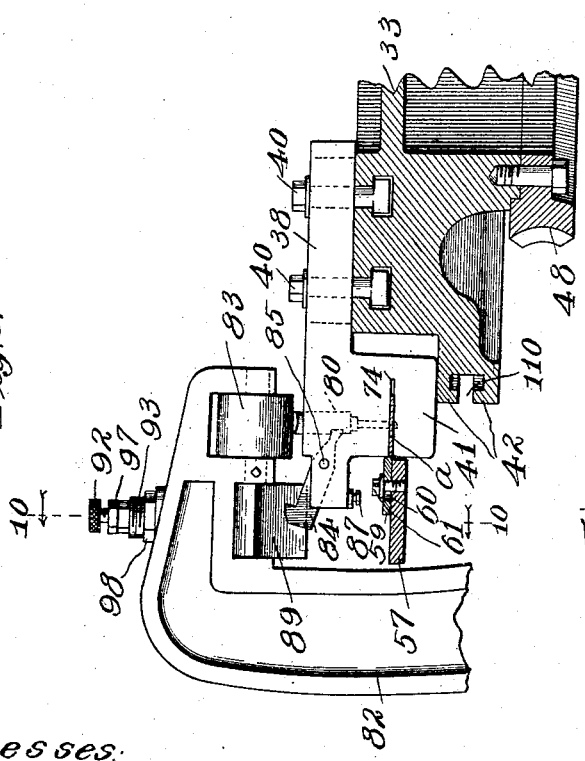
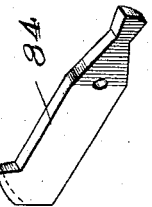
Witnesses:
G. W. Paukenschmidt
C. Paul Parker
Inventor:
Paul C. Schroeder,
By Miller & Chindahl
Attys.

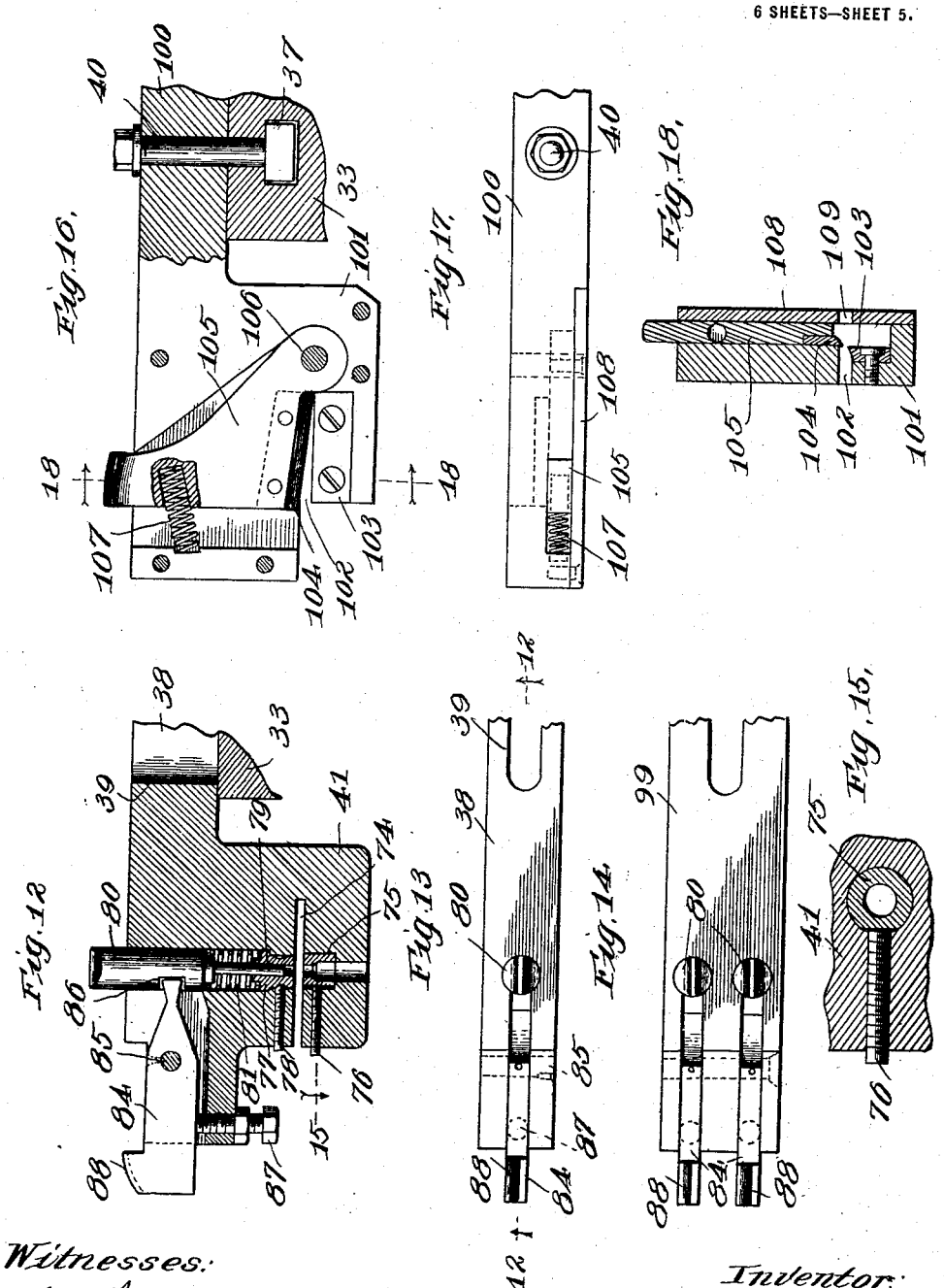

P. C. SCHROEDER.
PUNCHING MACHINE.
APPLICATION FILED MAR. 12, 1915.
1,213,275.
Patented Jan. 23, 1917.
6 SHEETS—SHEET 6.
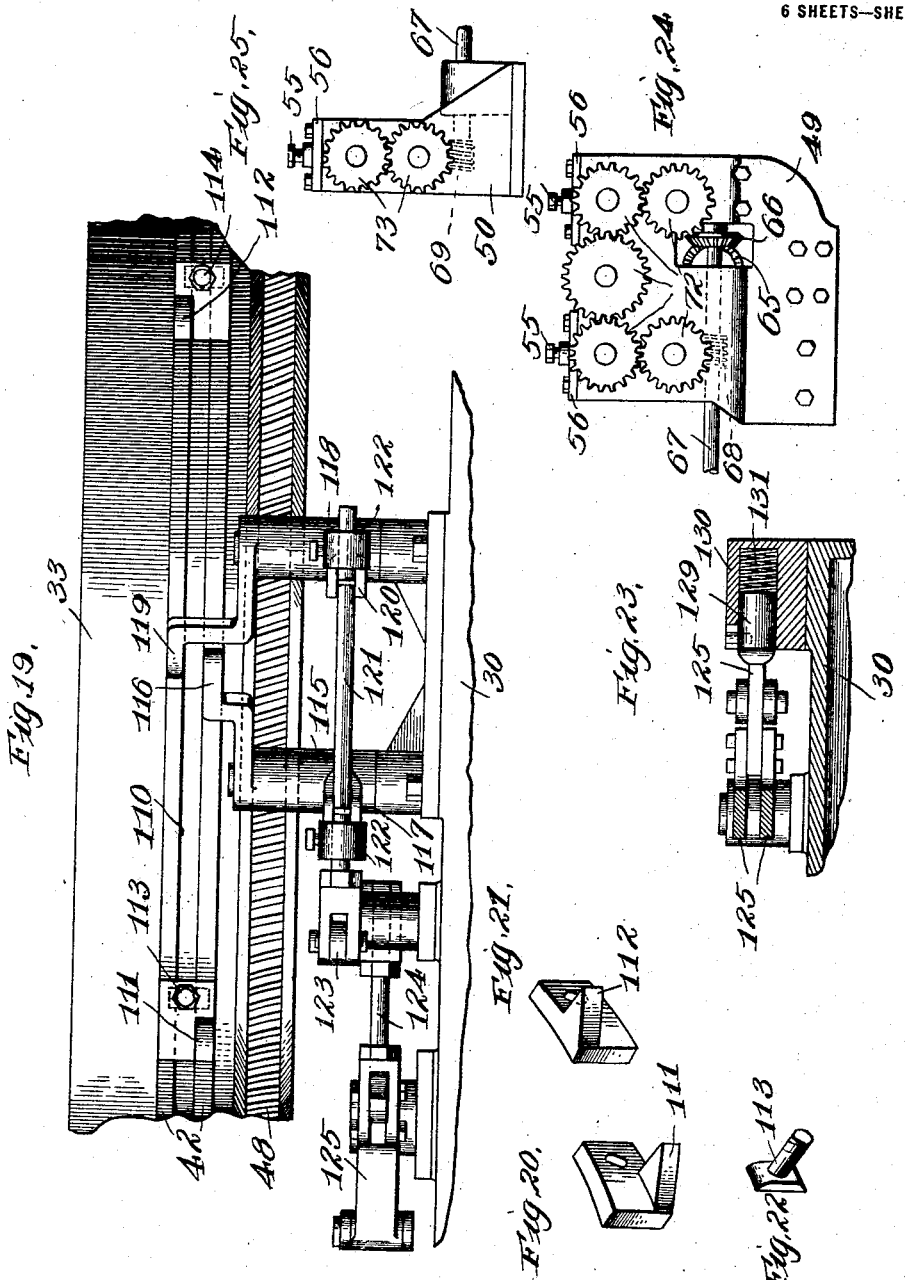
Witnesses:
Inventor:
Paul C. Schroeder
By Miller & Chindahl
Attys.

UNITED STATES PATENT OFFICE.

PAUL C. SCHROEDER, OF CHICAGO, ILLINOIS, ASSIGNOR TO SEARS, ROEBUCK AND COMPANY, OF CHICAGO, ILLINOIS, A CORPORATION OF ILLINOIS.

PUNCHING-MACHINE.

1,213,275.  Specification of Letters Patent.  Patented Jan. 23, 1917.

Application filed March 12, 1915. Serial No. 13,845.

*To all whom it may concern:*

Be it known that I, PAUL C. SCHROEDER, a citizen of the United States, residing at Chicago, in the county of Cook and State of Illinois, having invented certain new and useful Improvements in Punching-Machines, of which the following is a specification.

This invention relates to punching machines, and contemplates more particularly a machine adapted to punch holes in strips or bands of metal, leather, or other material.

It has for one of its objects the production of a machine suitable for punching a series of holes in a band in a rapid and efficient manner and so arranged that the distance between the holes or the location of the holes either transversely or longitudinally on the band may be conveniently varied and adjusted.

The invention has for a further object the provision in such a machine of means for cutting the band into lengths or sections such as may be desired, and means for adjusting the length of the severed sections.

Further objects of the invention will be apparent from the following detailed description.

In the accompanying drawings, Figure 1 is a plan view of a machine constructed in accordance with my invention. Fig. 2 is an elevation of the machine looking toward the lower edge of Fig. 1. Fig. 3 is a vertical section through the band-feeding means and the punch-operating means, taken along the line 3—3 of Fig. 1. Fig. 4 is a central vertical section through the machine taken in the plane of the line 4—4 of Fig. 1. Figs. 5, 6 and 7 are sections along the lines 5—5, 6—6 and 7—7, respectively, of Fig. 1. Fig. 8 is a fragmental sectional view generally similar to the left-hand portion of Fig. 4, but showing one of the punching devices in association with the stationary operating means. Fig. 9 is another view of the punching mechanism taken at right angles to Fig. 8. Fig. 10 is a section along the line 10—10 of Fig. 8. Fig. 11 is a perspective view of the punch-retracting lever. Fig. 12 is a section of one of the punching devices along the line 12—12 of Fig. 13. Fig. 13 is a plan view of a punching device. Fig. 14 is a plan view of a double punching device. Fig. 15 is a section along the line 15 of Fig. 12. Fig. 16 is a sectional view of the means for severing the band into sections. Fig. 17 is a plan view of this severing or shearing means. Fig. 18 is a section of the shearing means along the line 18—18 of Fig. 16. Fig. 19 is an enlarged fragmental elevation of the machine, looking toward the right-hand edge of Fig. 1 and illustrating the tripping mechanism by which the feed of the band is controlled. Figs. 20 and 21 are perspective views of the tripping dogs. Fig. 22 is a perspective view of one of the T-bolts for mounting the dogs on the wheel. Fig. 23 is a section along line 23 of Fig. 1. Figs. 24 and 25 are elevations of connecting gears comprised in the band-feeding means.

The machine which is illustrated in the drawings represents the preferred embodiment of my invention and will be herein described in detail, without any intention, however, of limiting the invention to the form disclosed except as specified in the appended claims.

The machine comprises a rotary wheel carrying a suitable number of independently adjustable punching devices at its periphery, means for feeding the band to be punched tangentially to the periphery of the wheel and in position to be acted upon by the punching devices, and stationary means located approximately at the point of tangency and arranged to operate the punching devices successively as they move past. A shearing device may be mounted on the wheel in position to be actuated by said stationary operating means for severing the band into sections, and means is provided for controlling the band-feeding means to vary the length of such sections as desired.

The machine comprises a base 30 having a central vertical bearing 31 (Fig. 4) in which a shaft 32 is journaled. A rotary wheel 33 is positioned above the base and has a central bearing 34 receiving the shaft 32 and resting upon the bearing 31 of the base. The wheel may also be peripherally supported, near the place where the punching occurs, by a suitable number of bearing rollers 35 underlying the edge of the wheel and mounted in brackets 36 rising from the base. In the upper face of the wheel near its periphery are two circular undercut T-slots 37 concentric with each other and with the wheel. A plurality of radially extending punch supports 38 overlie these slots, being spaced apart at such distances as may be desired. Each of said supports has a longitudinal slot 39 to receive a pair of bolts 40, the heads of which engage in the respective slots 37 and which have nuts on their upper ends to clamp the support to the wheel 33. The supports are thus adjustable on the wheel both radially and circumferentially thereof, the radial adjustment varying the position of the holes in the band transversely, and the circumferential adjustment varying the distance apart of the holes longitudinally of the band. These punch supports extend beyond the periphery of the wheel and each of them has an enlarged head 41 at its outer end (see Fig. 12) in which is mounted a punch and a die which will be later described. The heads 41 rest upon a peripheral flange 42 (Fig. 8) on the wheel. It is the under side of this flange which runs upon the peripheral supporting rollers 35.

The wheel 33 is arranged to be rotated from a drive-shaft 43 having a tight and a loose pulley 44 and 45 thereon, said shaft being mounted in suitable bearings 46 on the base and having a worm 47 (Fig. 2) fixed on its middle portion, which worm meshes with a worm ring 48 secured to the underside of the wheel. The drive shaft 43 is constantly driven so that the wheel is rotated continuously.

The means for feeding the band to be punched comprises two upstanding brackets 49 and 50 (see Fig. 3) mounted on two adjacent corners of the base 30, the bracket 49 having two pairs of feed rollers 51 between which the band $a$ is passed and having a slotted guide 52 for the band positioned between the respective pairs of said rollers. The other bracket 50 has a single pair of feed rollers 53 between which the band passes. The upper rollers may be mounted for vertical adjustment to vary the distance between the two rollers of each pair so as to accommodate bands of different thicknesses. This may be accomplished by mounting the journals of the upper rollers in bearing blocks 54 (see Fig. 2) which lie in vertical slots in the supporting bracket and are engaged by screws 55 threaded in top-plates 56 and having lock-nuts thereon, whereby the position of the bearing blocks may be fixed. A horizontal table 57 is fixed at opposite ends to the respective supporting brackets 49 and 50 in such position with respect to the feed rollers that the band will be fed along the upper face of said table. The supporting brackets 49 and 50 and the table 57 are position so that the band $a$ is fed tangentially to the wheel 33, the edge of the table adjacent to the wheel being cut out on an arcuate line to accommodate the punch supports 38 in their travel.

Fixed guide strips 58 (Fig. 1) are positioned on the upper face of the table 57 at opposite sides of this cut away portion and an adjustable guide strip 59 runs from end to end of the table, the band passing between the latter strip and the two fixed strips and being guided thereby. The adjustable strip 59 has transverse slots 60 to receive screws 61 by which said strip is fixed to the table. A leaf spring 62 is fixed at one end to the table and is arranged to press the band down against the face of the table.

The feed rollers 51 and 53 are arranged to be driven from the drive-shaft 43. One end of this shaft has a clutch sleeve 63 loosely mounted thereon and journaled in a bearing 127 at the lower end of the supporting bracket 49, said sleeve being arranged to be fixed to the shaft by a coöperating clutch sleeve 64 which is slidably splined on the shaft. The movable clutch sleeve 64 is arranged to be automatically operated by means to be later described, whereby to control the feed of the band. The loose clutch sleeve 63 has a beveled pinion 65 rigid therewith which meshes with a beveled pinion 66 fixed on a shaft 67 which is mounted in the supporting brackets 49 and 50. This shaft has two worms 68 and 69 fixed thereon and meshing with worm wheels 70 and 71 rigid with the journals of one of the lower feed rollers 51 and the lower feed roller 53, respectively. The journals of all the feed rollers 51 are connected by a train of gears 72 as shown in Fig. 24, while the two rollers 53 are geared together by gears 73. Thus when the shaft 67 is rotated all of the feed rollers will be positively driven to feed the band. At about the point of tangency of the band and the wheel 33 the band is punched by means which will now be described.

Referring to any one of the individual punch supports 38 (Fig. 12), the head 41 thereof has a horizontal slot 74 positioned in the proper plane to receive the band $a$ as the support is carried into association therewith by the rotation of the wheel. A die 75 is mounted in the head 41 at the lower side of the slot 74, said die being held in place by a set-screw 76. At the upper side of the slot and registering with the die 75 is a guide 77 held in place by a set-screw 78 and having a central guide opening through which a punch 79 reciprocates. This punch has an enlarged head 80 slidably guided in an opening in the support, the punch being normally pressed upwardly by a coiled spring 81 surrounding the punch and bearing between the head 80 thereof and the guide 77.

As the wheel 33 revolves the punching devices thereon are successively carried into association with a stationary operating means, which comprises a bracket 82 fixed to the base 30 at about the point of tangency of the band and the wheel, said bracket having an angular upper end overhanging the path of the punching devices. In this angular end is mounted a roller 83, and as the punching devices pass beneath this roller the inclined upper ends of the punch heads 80 abut against the roller so that the punches are depressed thereby.

As before stated, the compression spring 81 tends to raise the punch after depression, but for heavy work this spring may not be sufficient to force the punch up out of the band. For this reason, positive means is provided for raising the punch, said means comprising a lever 84 pivoted at 85 in a slot in the punch-support and having one end engaging in a recess 86 in the punch head 80. A set-screw 87 mounted in the punch-support engages the opposite arm of this lever and limits the swinging movement thereof in the upward movement of the punch. The spring 81 is thus prevented from raising the punch too high. The outer end of the lever has a lug 88 thereon which is beveled transversely and is inclined or curved longitudinally of the lever. A cam member 89 (see Figs. 9 and 10) is pivoted at 90 in the bracket 82, one end of said member being inclined to coöperate with the lug 88 so that the lever 84 will be swung by engagement with said inclined end to raise the punch 79 after it has been depressed by the roller 83. The opposite end of the cam member carries a set-screw 91 arranged to bear against the bracket 82 and limit the downward movement of the cam member. Upward swinging movement of the cam member is prevented by adjustable means mounted in the bracket above said cam member, said means comprising a screw 92 threaded in a bushing 93 which in turn is threaded in a vertical hole 94 through the bracket, the lower end of the screw extending slidably into a sleeve 95 which is vertically slidable in said hole and bears against the cam member 89. A coiled spring 96 surrounds the screw 92 and bears between the bushing 93 and the sleeve 95, tending to force the latter downwardly. Said sleeve thus forms a cushioned abutment against which the cam member 89 bears, the lower end of the screw 92 constituting a rigid stop for said cam member. The tension of the spring may be varied by adjusting the bushing 93. Suitable lock-nuts 97 and 98 may be provided for locking the screw 92 and bushing 93.

The continuous rotation of the wheel 33 carries the successive punch supports 38 into association with the band $a$ which enters the slots 74 in the punch supports, and when the latter pass beneath the stationary operating means each punch 79 is depressed by the roller 83 and is then immediately raised by its spring 81 and by the lever 84 and coöperating cam member 89. The punch supports travel at the same speed as the band so that the punch may operate while the band is moving without danger of breaking the punch. The period during which the punch and the band are in engagement, however, is very short. As hereinbefore stated, the position of the holes in the band may be varied transversely of the band by adjusting the punch supports radially on the wheel 33 and the position of said holes longitudinally of the band may be controlled by suitably spacing the supports circumferentially of the wheel.

In case two holes are to be punched in the band so close together as to make the use of two punch supports impracticable, a single support 99, such as illustrated in Fig. 14, may be used for two or more punching devices.

When it is desired to have the machine cut the band into sections, a support 100 for a shearing device is mounted on the wheel in the same manner as the punch supports 38 and 99, except the shear support is not slotted for its securing bolts since it need not be radially adjustable on the wheel. The shearing means is illustrated in Figs. 16, 17 and 18. The support 100 has an enlarged head 101 on its outer end which is recessed on one side and is provided with a horizontal slot 102 to receive the band. At the lower side of this slot is mounted a stationary shear blade 103 and above the slot is a movable shear blade 104 which is mounted on a member 105 pivoted at 106 to the head 101. A compression spring 107 normally holds the movable shear element raised. Said shear element is seated in the recess in the head and the element abuts against the wall of said recess at its upper end and is thereby limited in its upward movement. A plate 108 is secured to the side of the head and overlies the recess and confines the movable shear element in position to properly coöperate with the stationary blade. The plate 108 has a slot 109 to receive the band. The upper end of the movable shear element projects beyond the upper face of the head 101 and is arranged to be engaged and depressed by the stationary operating roller 83 so as to sever the band. If desired, a plurality of shearing devices may be mounted on the wheel, being spaced apart at suitable distances to cut the band into sections of the desired length.

In some cases, particularly where one or more shearing devices are employed, it becomes desirable to provide automatic means for stopping and starting the band feed. The means herein shown for this purpose comprises two tripping dogs mounted on the periphery of the wheel 33 and means operable by said dogs for opening and closing the clutch 63, 64, to start and stop the travel of the band. The illustration of this feature will be found in Figs. 1, 2 and 5, and Figs. 19 to 23. The flange 42 at the edge of the wheel 33 has a peripheral undercut T-slot 110 therein, the slot being seen in cross-section in Figs. 4, 7 and 8. Two dogs 111 and 112 (Figs. 19 to 21) have flat bases which are clamped to the periphery of the flange 42 by bolts 113 and 114 having their heads engaging in the T-slots and having nuts for fixing the dogs to the flange. The leading dog 111 is located on the lower edge of its base, while the following dog 112 is on the upper edge of its base, so that the two dogs lie in different horizontal planes. Two lever devices mounted on the base 30 are arranged to be engaged by the respective dogs. The device 115 comprises a sleeve having an arm 116 provided with a hooked end which lies in a plane to be engaged by the dog 111, the sleeve also having an arm 117. The other lever device 118 comprises a sleeve having an arm 119 provided with a hooked end lying in a plane to be engaged by the dog 112, the sleeve also having an arm 120 thereon. A rod 121 is supported in the two arms 117 and 120 of the lever devices and has collars 122 thereon, so that when either of the lever devices is operated the rod will be longitudinally moved, and will operate the other device. A lever 123 mounted between its ends upon the base 30 has one end pivoted to the rod 121, the other end of said lever being connected by a link 124 with one arm of a bell-crank 125, the other arm of which bell-crank is attached to a long rod 126. This rod extends beneath the main drive-shaft 43, as seen most plainly in Fig. 2, and the end of the rod opposite the bell-crank is slidable in a bearing 127 (Fig. 6) at the lower end of the supporting bracket 49. A yoke 128 (Figs. 2 and 5) is fixed on the rod and engages in an annular groove in the slidable clutch element 64, so that when the rod 126 is longitudinally moved the clutch element will be moved into and out of engagement with its coöperating element. Spring means is provided for holding the clutch-operating means in one or the other position, said means comprising a plunger 129 (see Fig. 23) slidable in a bearing 130 on the base and having a wedge-shaped end which is pressed against the wedge end of the bell crank 125 by a spring 131.

The two hooked arms 116 and 119 of the tripping devices extend toward each other, the hooked ends lying one above the other, and these two arms are connected together by the means described, so that when one of the arms is operated by its dog, the other is simultaneously moved into position to be engaged by its dog. In the arrangement and position of the parts as they appear in Fig. 1, the leading dog 111 has engaged its arm 116, the clutch 63, 64, having thus been opened and the feed of the band instantly stopped. At the time this dog engaged its arm, the shearing device 100 was in position beneath the stationary operating means 82, 83. The continued rotation of the wheel will bring the following dog 112 into engagement with its arm 119 to close the clutch 63, 64, and start the feed of the band. In this movement of the wheel the punching device directly following the shearing device will have been carried beneath the stationary operating means, so that a hole will be punched near the leading end of the section of band next to be severed. In other words, with the dogs 111 and 112 spaced as shown in Fig. 1, the feed of the band will be stopped during that portion of rotation of the wheel which is approximately represented by the arc between the shearing device and the next following punching device. Thus the length of sections of the band which are severed will be approximately equal to the circumferential length of the remaining arc of the wheel.

From the foregoing it will be understood that the machine is capable of a wide range of adjustment so as to punch holes in any desired location in the band, either transversely or longitudinally thereof, and also, if desired, to cut the band up into sections of predetermined lengths. If it is not desired to sever the band into sections, the shearing device or devices are removed from the wheel, and if it is desired to feed the band continuously, the tripping dogs 111 and 112 are removed from the flange 42.

I claim as my invention:

1. A punching machine having, in combination, a rotary wheel, a series of punching devices mounted about the periphery of said wheel for adjustment both radially and circumferentially of the wheel, means for rectilinearly feeding a metal band tangentially to said wheel with the opposite faces of the band lying in planes parallel with the plane of the wheel, and means for operating the punching devices as they come into association with the band.

2. A punching machine having, in combination, a circular wheel rotatably mounted on a central axis, a plurality of punch supports mounted about the periphery of said wheel for adjustment both radially and circumferentially of the wheel, said supports projecting beyond the periphery of the wheel and having enlarged heads on their outer ends, a work-receiving slot in each head, a punch in each head operatively related to the slot, means for operating the punches, and means for feeding the material to be punched into the slots.

3. A punching machine having, in combination, a rotary wheel, a series of punch supports mounted about the periphery of said wheel, each support having a slot therein, a feed-table having one edge cut away to accommodate the punch supports in their travel, feed rollers for rectilinearly feeding a band along the table and through the slots in the punch supports, and stationary operating means located at about the point of tangency and arranged to successively operate the punching devices.

4. A punching machine having, in combination, a rotary wheel, a series of punching devices mounted about the periphery of said wheel and each independently adjustable both radially and circumferentially of the wheel, a feed-table at one edge of the wheel along which the band to be punched is fed, means including feed rollers at opposite ends of said table for feeding the band tangentially to the wheel, and stationary operating means located at about the point of tangency and arranged to successively operate the punching devices.

5. A punching machine having, in combination, a rotary support, a series of punching and severing devices mounted thereon, rollers for feeding a band into position to be acted on by said punching and severing devices, means for operating said punching and severing devices, means for stopping and starting the band-feeding rollers, and adjustable means mounted on said rotary support for actuating said stopping and starting means.

6. A punching machine having, in combination, a series of punching and severing devices, means for causing said devices to travel in a prescribed path, rollers for longitudinally feeding a band into operative relation to said path, means for operating said punching and severing devices, and means operable during the continuing travel of the punching and severing devices for stopping and starting the band-feeding rollers.

7. A punching machine having, in combination, a rotary wheel having in its upper face two undercut annular grooves concentric with each other and with the wheel, a series of punching devices mounted about the periphery of said wheel and overlying said grooves, each of said devices being longitudinally slotted, a pair of bolts for each device engaging in the undercut slots in the wheel and passing through the slot in the punching device, whereby the devices are individually adjustable both radially and circumferentially of the wheel, means for supporting material to be punched in position to be acted on by said devices, and means for operating said devices.

8. A punching machine having, in combination, a circular wheel rotatably mounted on a central axis, a plurality of punch supports mounted about the periphery of said wheel for adjustment both radially and circumferentially of the wheel, said supports projecting beyond the periphery of the wheel and having enlarged heads on their outer ends, punching devices mounted in said heads, operating means therefor, and means for supporting the material to be punched.

9. A punching machine having, in combination, means for longitudinally feeding a band to be punched, a rotary support, a plurality of punching devices circumferentially mounted on said support, each of said devices having a slot adapted to receive the band and having a punch and a die located respectively above and below said slot, and stationary operating means having a portion located above the band and arranged to engage the upper ends of the successive punches to depress the latter.

10. A punching machine having, in combination, means for longitudinally feeding a band, a rotary wheel, a plurality of punching devices circumferentially mounted on said wheel, each of said devices having a slot to receive the band and having a punch and die located respectively above and below said slot, a lever pivoted on each punching device and engaging the punch element, and stationary operating means comprising a portion arranged to engage and depress the punch elements and comprising another portion arranged to engage and swing said levers to raise the punch elements.

11. A punching machine having, in combination, a rotary wheel, a series of punch supports mounted on said wheel and having enlarged heads projecting beyond the periphery thereof, said heads having slots therein, means for longitudinally feeding a band tangentially to said wheel and in a plane to be received in said slots, a punch element and a die element mounted in the head of each punch support respectively above and below the slot therein, a lever pivoted in each head and engaging the punch element, a stationary bracket located at the point of tangency of the band and wheel, the upper end of said bracket overhanging the band and the path of the punching devices, a roller mounted in said overhanging portion and arranged to successively engage the upper ends of the punch elements to depress the latter, and a cam member mounted in said bracket and arranged to engage and swing said levers to raise said punch elements.

12. A punching machine having, in combination, of a series of traveling punching devices each comprising a movable punch element and means for raising said element, and stationary operating means comprising a portion arranged to engage and depress said punch element and another portion arranged to operate said raising means.

13. A punching machine having, in combination, a series of traveling punching devices each comprising punching means and means for raising the punch element, and stationary operating means arranged to engage first the punch elements and then the raising means during the travel of the series of punching devices.

14. A punching machine having, in combination, a series of punching devices, means for causing said devices to travel in a prescribed path, means for longitudinally feeding a band into operative relation to said path, means for operating said punching devices, and means operable by the first mentioned means for stopping and starting the band-feeding means.

15. A punching machine having, in combination, a rotary support, a series of punching devices mounted thereon, means for feeding a band into position to be acted on by said punching devices, means for operating said punching devices, means for stopping and starting the band-feeding means, and means mounted on said rotary support for actuating said stopping and starting means.

16. A punching machine having, in combination, a rotary support, a series of punching devices mounted thereon, means for feeding a band into position to be operated on by said punching devices, punch-actuating means, means including a clutch for driving said band-feeding means, and means operable by said rotary support for opening and closing said clutch.

17. A punching machine having, in combination, a rotary wheel, a series of punching devices mounted thereon, means for feeding a band into position to be acted on by said punching devices, punch-actuating means, means including a clutch for starting and stopping said band-feeding means, and a pair of tripping dogs mounted on said wheel and arranged to operate said starting and stopping means.

18. A punching machine having, in combination, a plurality of punching devices and a shearing device, means for causing said devices to travel, means for operating said devices, means for longitudinally feeding a band into position to be acted upon by said devices, and means for controlling the feed of the band to govern the length of the sections cut by said shearing device.

19. A punching machine having, in combination, a plurality of punching devices and a shearing device, means for causing said devices to travel in an endless path, means for operating said devices, means for longitudinally feeding a band into position to be acted on by said devices, and means for controlling the feed of the band, whereby to govern the length of the sections severed by said shearing device.

20. A punching machine having, in combination, punching means, shearing means, means for causing said punching means and shearing means to travel in an endless path, means for longitudinally feeding a band into position to be acted upon by both of said means, and means operatively connected with said travel causing means for controlling the feed of the band, whereby to govern the length of sections severed by said shearing means.

21. A punching machine having, in combination, a horizontal rotary wheel, a series of punching devices and a shearing device mounted thereon, means for actuating said devices, means for feeding a band into position to be acted on by said devices, said band-feeding means including a clutch, means for operating said clutch, and a pair of tripping dogs mounted on the periphery of said wheel in different horizontal planes, said clutch-operating means comprising two arms arranged to be engaged by the respective tripping dogs.

22. A punching machine having, in combination, a horizontal rotary wheel, a series of punching devices and a shearing device circumferentially mounted thereon, means for longitudinally feeding a band tangentially of the wheel into position to be acted on by said devices, stationary means for operating said devices at about the point of tangency, a drive-shaft, a clutch connecting said drive-shaft to the band-feeding means, an operative connection between said drive shaft and said rotary wheel, means for opening and closing said clutch, and means on said wheel for operating said clutch opening and closing means.

23. A punching machine having, in combination, a horizontal rotary wheel, a series of punching devices and a shearing device circumferentially mounted on the upper face of said wheel, means for longitudinally feeding a band tangentially to said wheel into position to be acted on by said devices, stationary operating means located at the point of tangency and adapted to successively actuate said devices, a drive-shaft, a clutch connecting said shaft to said band-feeding means, a worm fixed on said shaft, a worm-ring fixed to the underside of said wheel and meshing with said worm, means for operating said clutch including two arms positioned at different horizontal planes adjacent to the periphery of said wheel, and two tripping dogs mounted on the periphery of the wheel and adapted to engage the respective arms to open and close said clutch.

24. A punching machine having, in combination, a horizontal rotary wheel, a series of punching devices circumferentially mounted on said wheel, a horizontal table and feeding rollers located at one edge of said wheel and adapted to feed a band tangentially to the latter, and stationary operating means located at about the point of tangency for successively actuating said punching devices.

25. A punching machine having, in combination, a suitable base, a horizontal rotary wheel mounted thereon, means mounted on the base at one edge of said wheel comprising a table and brackets at opposite ends of said table carrying rollers adapted to feed a band, a series of punching devices mounted on said wheel and adapted to be carried into operative relation to said band, stationary operating means arranged to actuate said punching devices when in such operative relation, a horizontal drive-shaft connected to said band-feeding means, a worm on said shaft, and a worm-ring mounted on said wheel and meshing with said worm.

In testimony whereof, I hereunto set my hand in the presence of two witnesses.

PAUL C. SCHROEDER.

In the presence of—
C. J. CORNWELL,
E. L. CURTIS.

Copies of this patent may be obtained for five cents each, by addressing the "Commissioner of Patents, Washington, D. C."

It is hereby certified that the State of incorporation of the assignee in Letters Patent No. 1,213,275, granted January 23, 1917, upon the application of Paul C. Schroeder, of Chicago, Illinois, for an improvement in "Punching-Machines," was erroneously given as "Illinois," whereas said State should have been given as *New York;* page 1, line 5, of the printed specification, for the word "having" read *have;* page 2, line 61, for the word "position" read *positioned;* page 5, line 122, claim 12, strike out the word "of", first occurrence; and that the said Letters Patent should be read with these corrections therein that the same may conform to the record of the case in the Patent Office.

Signed and sealed this 13th day of February, A. D., 1917.

[SEAL.]

R. F. WHITEHEAD,
*Acting Commissioner of Patents.*

Cl. 164—15.